(12) United States Patent
O'Connor et al.

(10) Patent No.: US 9,436,841 B2
(45) Date of Patent: *Sep. 6, 2016

(54) ENHANCED SYSTEM SECURITY

(71) Applicant: salesforce.com, inc., San Francisco, CA (US)

(72) Inventors: Brendan T. O'Connor, San Francisco, CA (US); James L. Cavalieri, III, Oakland, CA (US); Robert C. Fly, Moraga, CA (US)

(73) Assignee: salesforce.com, inc., San Francisco, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/266,657

(22) Filed: Apr. 30, 2014

(65) Prior Publication Data

US 2014/0237234 A1    Aug. 21, 2014

Related U.S. Application Data

(63) Continuation of application No. 12/750,639, filed on Mar. 30, 2010, now Pat. No. 8,751,826.

(60) Provisional application No. 61/165,825, filed on Apr. 1, 2009.

(51) Int. Cl.
*G06F 21/62* (2013.01)
*H04L 9/08* (2006.01)
*H04L 9/32* (2006.01)

(52) U.S. Cl.
CPC ......... *G06F 21/6218* (2013.01); *H04L 9/0894* (2013.01); *H04L 9/321* (2013.01); *H04L 2209/60* (2013.01); *H04L 2209/80* (2013.01)

(58) Field of Classification Search
CPC . G06F 21/6218; H04L 9/321; H04L 9/0894; H04L 2209/80; H04L 2209/60
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Joseph P Hirl
*Assistant Examiner* — J. Brant Murphy
(74) *Attorney, Agent, or Firm* — Lorenz & Kopf LLP

(57) ABSTRACT

Methods and systems for maintaining the confidentiality of data provided by an organization for storage on a third party database system are provided. The data can be encrypted on an internal network of the organization and sent to the third party database system for storage. The third party database system can associate metadata with the encrypted data and can store the encrypted data. Accordingly, when a request for the encrypted data is received from a computing device communicating with an internal network of the organization, the encrypted data and associated metadata can be sent to the computing device. A key that is stored on an internal network of the organization can be called through an applet, which utilizes information within the metadata to locate the key on the internal network of the organization.

20 Claims, 8 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,185,567 B1 * | 2/2001 | Ratnaraj | G06F 17/30893 |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,931,532 B1 * | 8/2005 | Davis | G06F 21/6209 380/273 |
| 7,062,502 B1 | 6/2006 | Kesler | |
| 7,111,005 B1 * | 9/2006 | Wessman | G06F 21/604 |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,261,068 B1 * | 9/2012 | Raizen | G06F 21/6218 713/164 |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,909,939 B1 * | 12/2014 | Beda, III | G06F 21/606 713/189 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2006/0236090 A1 * | 10/2006 | Birum | A63F 13/10 713/150 |
| 2008/0178278 A1 * | 7/2008 | Grinstein | H04L 63/0227 726/12 |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2009/0285396 A1 * | 11/2009 | Wong | H04L 9/0819 380/277 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |

* cited by examiner

Page Elements
600

```
<HTML>
<head>
<applet>AES Applet</applet>
<script>
function doDecrypt
function doEncrypt
</script>
</head>
<body onload="doDecrypt">
<form onsubmit="doEncrypt">
<element1 keyGUID="key" value="ciphertext">
<element2 .... >
<element3 .... >
</form>
</body>
</HTML>
```

*FIG. 6A*

Applet Methods
650

```
Public methods doEncrypt(string, keyGUID) {
    return ciphertext;
} doDecrypt(string, keyGUID) {
    return plaintext;
}

Private methods getKeys() {
    HTTP Callout returns Map<keyGUID, keyValue>;
} readMetaData() {
    Protocol -- LDAP, WebService, API
    Server -- ldap://server1, https://server2
    Key ID -- XXXXX-XXXXX-XXXXX
} characterSecurity() {
    Validator List
    Entity Types
    Validate(input, validator)
    Render(output, entityType)
}
```

*FIG. 6B*

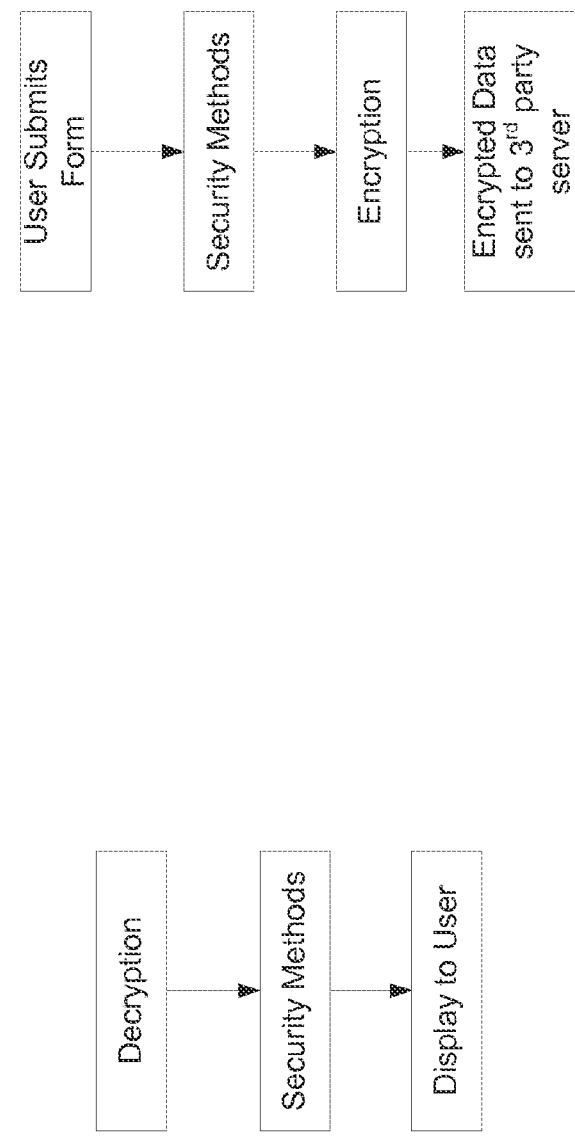

ENHANCED SYSTEM SECURITY

CLAIM OF PRIORITY

This application is a continuation of U.S. patent application Ser. No. 12/750,639, filed Mar. 30, 2010, which claims the benefit of U.S. Provisional Patent Application 61/165,825, filed Apr. 1, 2009.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to maintaining an organization's data confidential on a third party server, and more particularly to providing network access to an organization's data stored on a database maintained by a third party while keeping the data secure.

BACKGROUND

Running a company typically requires maintaining data related to the company's business, such as sales numbers, customers, business opportunities, and the like. Often, it is more effective for the company to have a third party maintain a database containing the data, as opposed to the company maintaining the database itself. For example, the third party can maintain the data base cheaper and/or provide greater functionality than the company could provide.

A drawback is that some or all of the data of the company may be highly sensitive, and the company wishes to keep the data confidential from hackers or even from the third party. For example, a bank may desire, and even be required by law, to maintain account numbers secret. A competing concern is that the company may wish to still provide efficient and easy access of the data to its employees.

Therefore it is desirable to provide a method and system that overcome the issues related to storage of confidential data on an external server.

BRIEF SUMMARY

Embodiments provide methods and systems for maintaining an organization's data confidential on a third party server. Accordingly, an organization can provide security and privacy of that data within the organization, while still taking advantage of third party servers. The organization can maintain access to the data (e.g., with keys) by encrypting and decrypting the data with one or more keys, and provide the already encrypted data to the third party. The third party can retain the encrypted data with additional metadata (e.g. a location of keys in the organization), which can enable the organization to quickly locate and decrypt that data internally when the data is called from the third party database for viewing. In addition, in some implementations, the third party server does not have access to any of the keys, thereby preventing the third party from obtaining the data.

In an embodiment and by way of example, a method of maintaining the confidentiality of data provided by an organization for storage on a third party database system is described. The method includes encrypting data using a first key, storing the encrypted data on the third party database system, associating metadata with the encrypted data, receiving a request for the encrypted data from a computing device communicating with an internal network of the organization, and sending the encrypted data with the associated metadata to the computing device. The first key is stored on an internal network (e.g. a server) of the organization. The third party database system associates the metadata with the encrypted data on a third party server and the metadata includes information usable to locate the first key, and potentially also how to use the first key. The computing device to which the encrypted data is sent is operable to locate the first key utilizing the associated metadata, decrypt the encrypted data using the first key, and display the unencrypted data, and can perform any additional operations specified by the metadata.

In another embodiment and by way of example, a system of maintaining confidentiality of data provided by an organization for storage on a third party database system. The system includes one or more processors, a network interface, and a memory for storing instructions to control the processors. The instructions include receiving data encrypted using a first key from the organization, storing encrypted data on the third party database system, associating metadata with the encrypted data on the third party database system, receiving a request for the data from a computing device communicating with an internal network of the organization and sending the encrypted data with the associated metadata to the computing device. The computing device is further operable to locate the first key, decrypt the encrypted data using the first key, and display the unencrypted data. The first key is stored on an internal server of the organization. The metadata includes information usable to locate the first key.

In another embodiment and by way of example, a computer program product comprising a tangible computer readable medium storing a plurality of instructions for controlling one or more processors of a third party database system to perform an operation for maintaining the confidentiality of data provided by an organization for storage on a the database is provided. The instructions include receiving data encrypted using a first key from the organization, storing the encrypted data on the third party database system, associating metadata with the encrypted data on the third party database system, receiving a request for the encrypted data from a computing device communicating with an internal network of the organization, and sending the encrypted data with the associated metadata to the computing device. The first key is stored on an internal server of the organization. The metadata includes information usable to locate the first key.

While the present invention is described with reference to an embodiment in which techniques for methods and systems for sharing information in a supply chain are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages. Further features and advantages, as well as the structure and operation of various embodiments, are described in detail below with respect to the accompanying drawings. In the drawings, like reference numbers indicate identical or functionally similar elements.

BRIEF DESCRIPTION OF THE DRAWINGS

FIGS. 6A-6B illustrate pseudocode for a page containing encrypted data and an applet accompanying the page according to an embodiment.

FIGS. 7A-7B illustrate security methods according to an embodiment.

DETAILED DESCRIPTION

Embodiments can provide improved security for organizations utilizing a third party database. Organizations utilize a key to encrypt data prior to sending the data to the third party system. The organization can selectively decide which data is to be encrypted and which key is to be utilized for the data, while still maintaining ease of use through the third party interface. The encryption information is never accessible to the third party system, thus confidentiality is maintained by the organization. Embodiments may use proprietary connectivity or standards based connectivity (e.g. XML, W3C).

In one embodiment, customers who must comply with industry or federal regulations regarding sending certain data outside the country would advantageously be able to use this feature to be in compliance. For example, some countries' legal regimes prohibit export of personal (or other sensitive data) for processing outside of the country (such as the European Union). The third party server would have no access to the plaintext data, and only the cipher text would be stored in the data centers. This embodiment would facilitate such export because data are encrypted at the client.

Various other embodiments can enable an organization to retrieve the data and decrypt the data for viewing. Further embodiments can allow the organization to modify the key, store multiple permissions dependent keys and determine time limitations for the key. In addition, embodiments can provide for the stored data to be searchable.

General Overview

Systems and methods are provided for preventing misuse of database searches. These techniques for preventing misuse of database searches can enable embodiments to provide more reliable operation, as an improper query will not shut down or severely affect the operation of the database.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

Next, mechanisms and methods for maintaining confidentiality of data in a database system will be described with reference to example embodiments.

System Overview

Figure 1A:
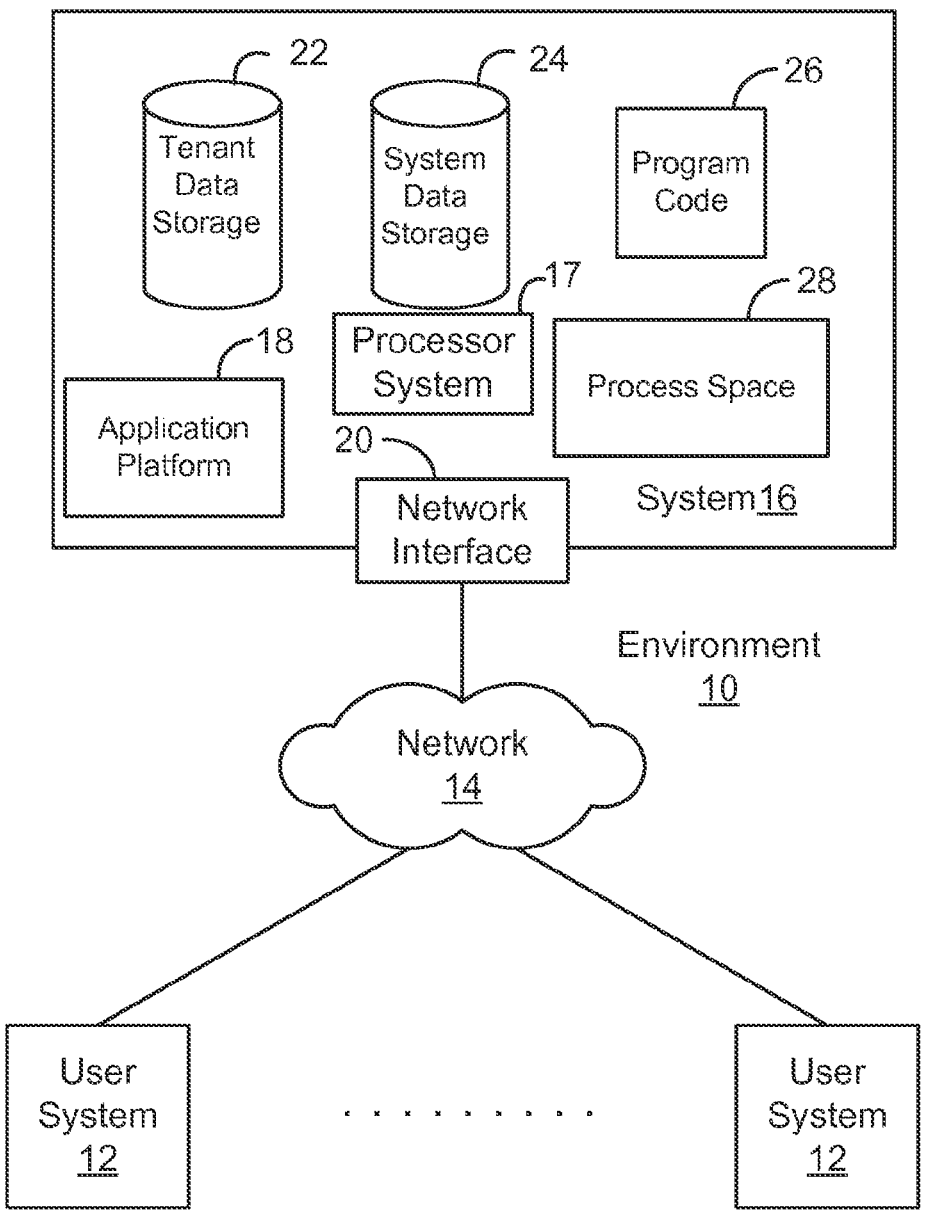
FIG. 1A illustrates a block diagram of an environment wherein an on-demand database service might be used.

FIG. 1A illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 1B) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
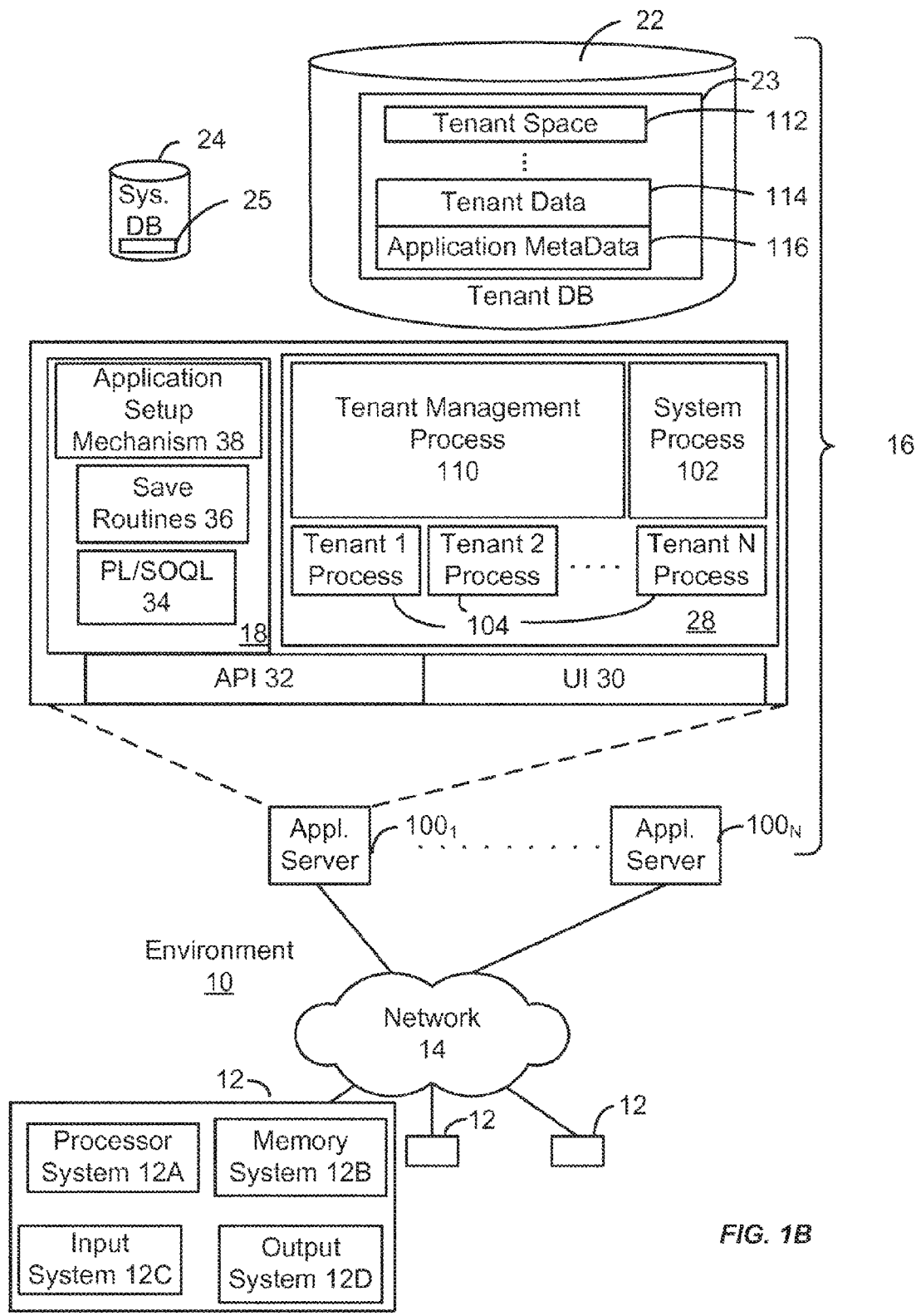
FIG. 1B illustrates a block diagram of an embodiment of elements of FIG. 1 and various possible interconnections between these elements according to an embodiment.

FIG. 1B also illustrates environment 10. However, in FIG. 1B elements of system 16 and various interconnections in an embodiment are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe maintaining confidentiality of data in accordance with aspects and embodiments. The maintaining confidentiality may include various encryption, decryption, storage and retrieval techniques. Further, searching this confidential data is then described. Following the searching description, various security measures for maintaining the confidential data are then described.

I. Maintaining Confidentiality of Data

Figure 2:
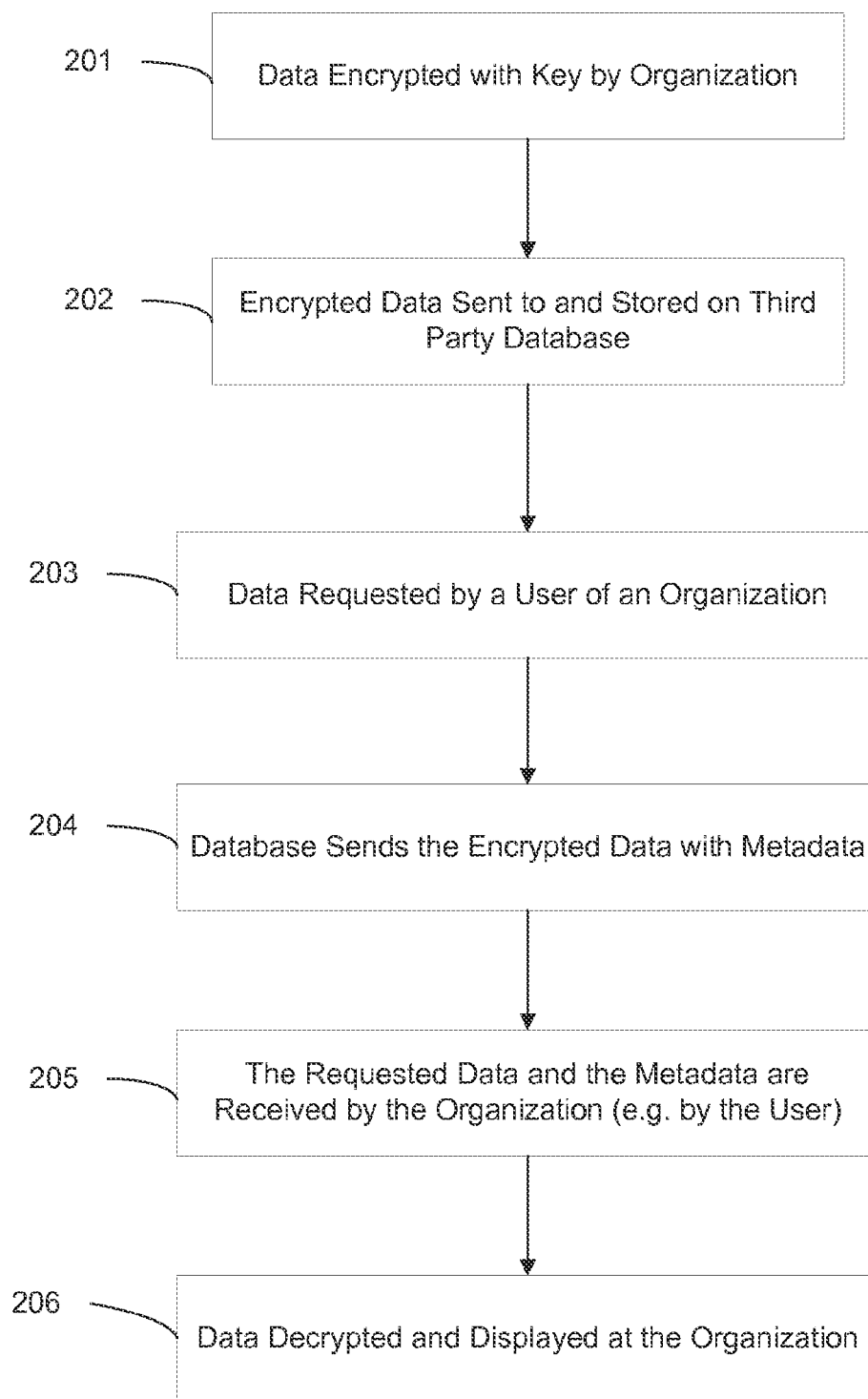
FIG. 2 illustrates a flowchart illustrating a method 200 implemented to maintain the confidentiality of data provided by an organization on a third party database system.
Figure 3:
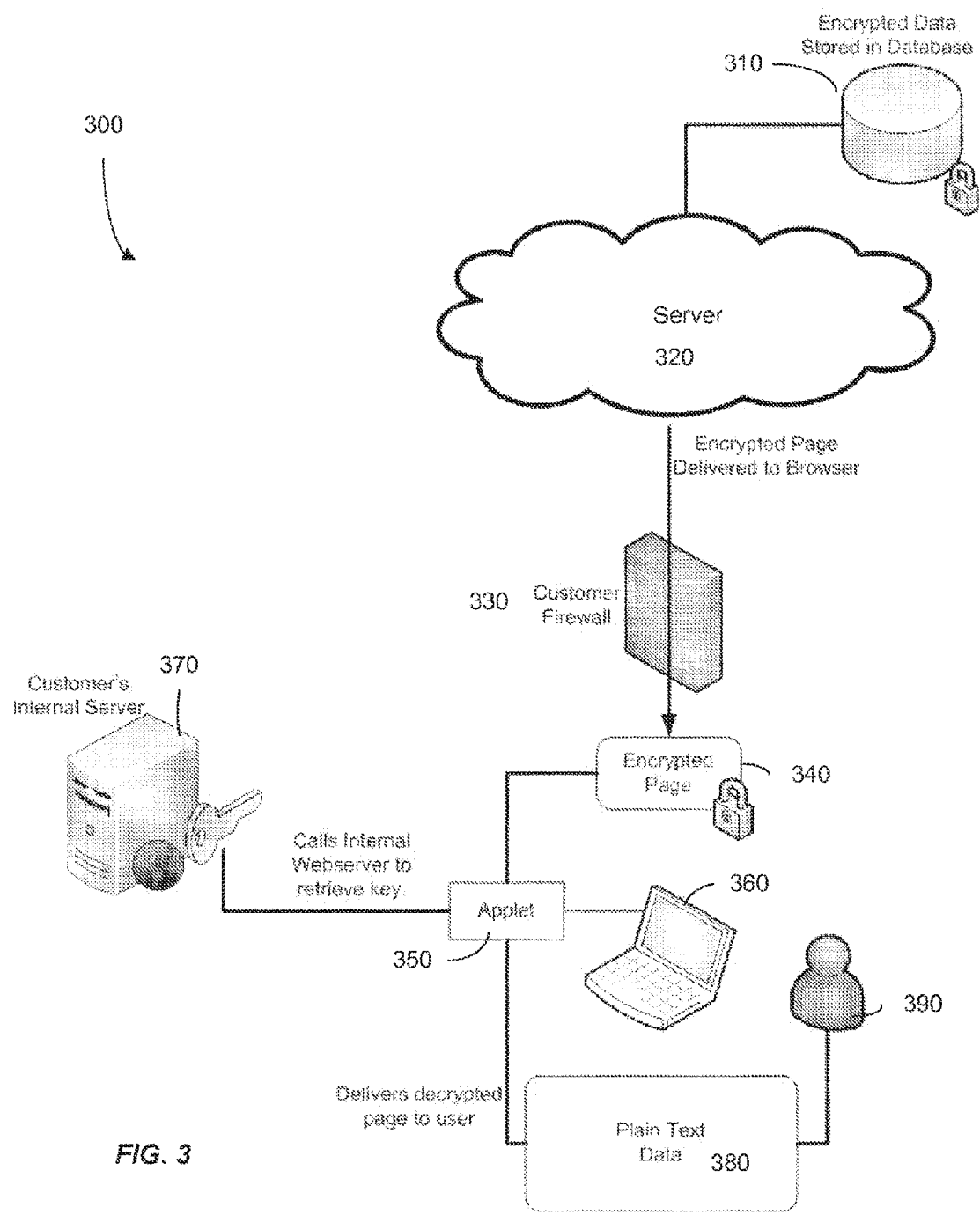
FIG. 3 illustrates a block diagram of a system and associated process flow involved in maintaining data confidential on a third party database system according to an embodiment.

FIG. 2 provides a general flow diagram of method 200 of maintaining confidentiality of data provided by an organization and stored on a third party database in accordance with embodiments of the disclosure. In describing method 200, reference is made to FIG. 3, which is a block diagram of a system utilized in maintaining data confidential on a third party database.

In step 201, data provided by an organization on a first network is encrypted before being stored on a third party database 310 (e.g. at system 16). In one implementation, an organization's internal server 370 (e.g. at user system 12)

encrypts the data prior to sending it to third party database 310. Alternatively, a different machine in the organization's internal network, such as a user computer, performs the encryption. The data may be encrypted in various ways prior to being stored on the third party database 310, e.g., using DES, AES, public key encryption, symmetric encryption, and asymmetric encryption.

In this manner, an organization can encrypt specified data without the third party database 310 having access to the plaintext data or the ability to decrypt the data (i.e., access to the encryption keys). In one implementation, the organization can elect which data is to be encrypted, whom has the ability to decrypt it, and the key utilized to do so. The data elected can be entire objects, including all fields, or only specific fields within an object or application. Accordingly, all fields and/or objects flagged for storage are first encrypted, for example, on the organization's internal sever 370 before being sent and stored on the third party database 310.

In step 202, the encrypted data, which may also be called ciphertext, is stored on third party database 310. Third party database 310, in one implementation, is part of a third party database system, which, in addition to the third party database 310, can include one or more an external servers 320. For example, the encrypted data can be sent from the organization's internal network to server 320, which accesses the database 310. In one implementation, the server 320 may be any software or hardware providing at least web access or other network connection capabilities, such as VPN. Accordingly, a user within the organization may be provided with a webpage which allows them to log in as a client of third party database 310 from an internal network to access data on the third party database. The user may be able to create a location in their account to store the encrypted data on the database, or may select an existent location to store the encrypted data.

The third party database 310 is configured to include storage for multiple organizations, which may also be referred to as clients or customers. When the encrypted data is received from a particular organization, it is associated and stored within the database with information, called metadata, to identify and locate it. However, the metadata may also include additional information which is utilized to locate information corresponding to the encrypted data on the organization's internal network. As discussed above, the data may be encrypted with a specified key by the organization prior to being stored on the third party database 310. Accordingly, the encrypted data can include metadata with particular key location information, allowing the key to be easily located and retrieved, for example, by the organization's internal server 370. This location information may include an address to a memory location, such as, a universal resource locator (URL) or a file directory address to a hard drive.

In step 203, the stored ciphertext is requested by a user 390 within the organization. The user may access the third party database 310 through an internal network via a computing device 390, such as a PDA, laptop, Smartphone, personal computer or another similar device including a display, processor, memory, inputs and network accessibility. For example, the user may log in to the database 310 through a webpage provided by an external server 320 and select a specified object for viewing. This object may be stored on the third party database 310 in encrypted form.

In step 204, the database 310 sends the data along with metadata, e.g. as part of a requested web page. The metadata may include an identifier which is associated with the encryption key and a local, or internal, address where that encryption key may be found. The metadata may also include additional information, such as permissions, status (e.g., active, expired, retired) and any security checks which are to be performed on the associated encrypted data. In addition, the metadata may specify the algorithm utilized for encryption and for use by an applet, which calls and performs the decryption. Code for retrieving the key and performing the decryption may also be provided within the metadata. Alternatively, the metadata may include additional location information for a local program to be utilized.

When the encrypted data is called from the computing device on the internal network, in one implementation, a firewall 330 that separates an organization's internal network from the external network (e.g. the Internet) having server 320 is utilized for further security precautions. Accordingly, the encrypted data can be filtered before entering the internal network and may include additional information within metadata to pass through such filtering.

In step 205, an encrypted page 340 of data is received in the internal network (e.g. after the data passes through the firewall) by the internal server 370 and downloaded by a browser page on a user's computing device 360. As mentioned above, the encrypted page 340 can include an applet 350, or another small application program or plug-in, which can run on the computing device 360 from which the encrypted data is called. The encrypted page 340 also can include any additional metadata associated with the encrypted data when it was stored the third party database 310 and given by the third party database to that encrypted data. When the applet 350 is run, the metadata associated with the encrypted data on the encrypted page 340 can be utilized to call the key from the specified location in the internal network, such as the internal server 370 at the organization.

In step 206, the data is decrypted and displayed in plain text to the user. In one embodiment, the applet 350 uses the location information from the metadata to obtain the key from the customer's internal server 370. This location information may be a URL or other address, file locator or similar identifying information that directs the applet to a specific storage location. Once the key is retrieved, the applet 350 can utilize the key to decrypt the encrypted data and obtain the plain text data 380, which then can be displayed to the user 390.

This process can be completely transparent to the user 390 of the computing device 360. When the user 390 calls the information, the encrypted page 340 can be downloaded and the applet, key location and decryption occur. Additional security measures may also be utilized by the applet 350 prior to displaying the decrypted data. This may include validation done on metadata associated with the unencrypted data as well as validation done on metadata associated with the encrypted data. The latter of which, generally, occurs first, then the data is decrypted, and then the final validation is performed on the decrypted data. Such additional security precautions are further discussed in the following paragraphs under the section entitled "Security Considerations."

A. Storing the Data

Figure 4:
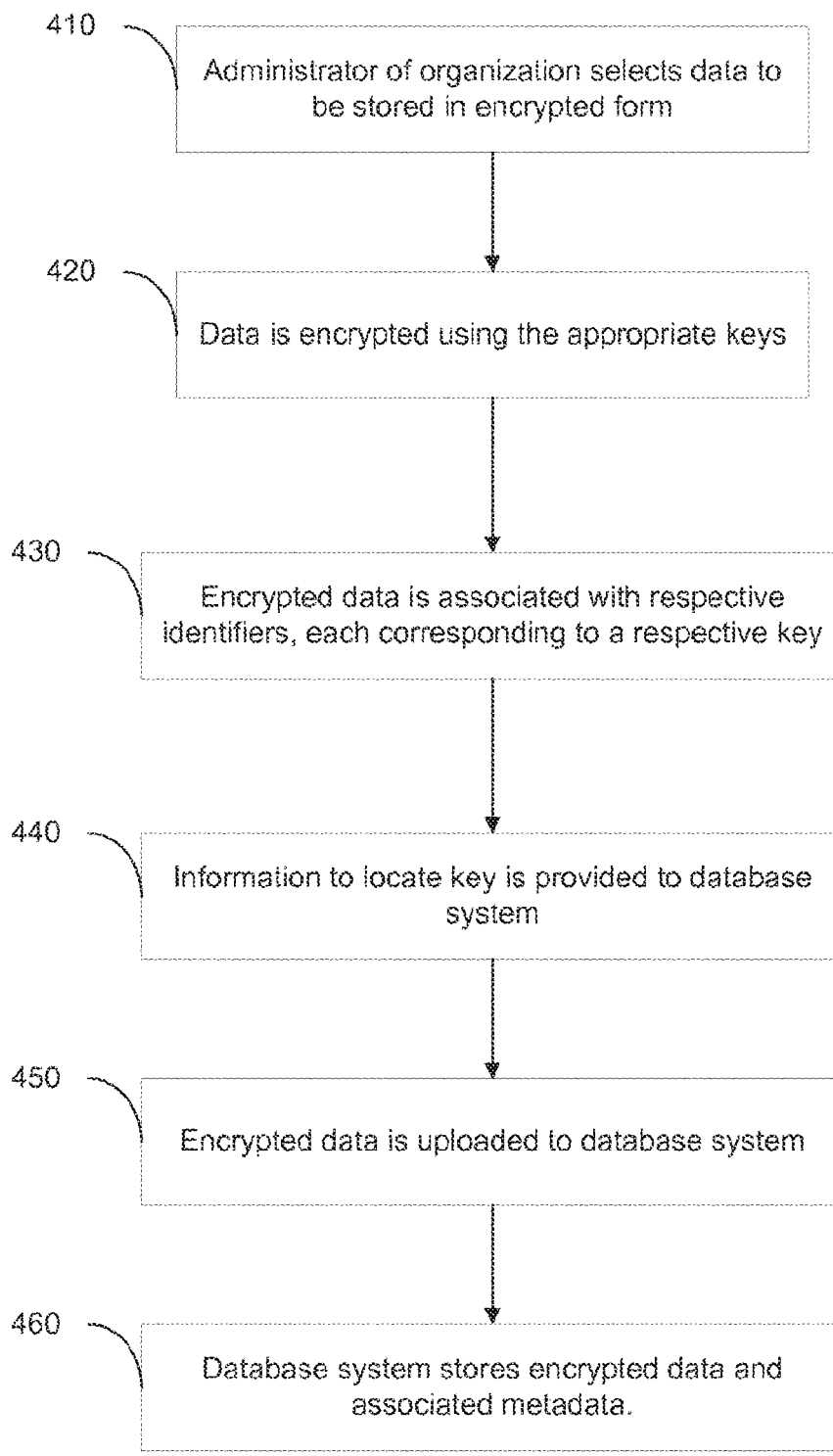
FIG. 4 is a flowchart illustrating a method 400 implemented by an organization to use a third party database system to store encrypted data according to an embodiment.

FIG. 4 is a flowchart illustrating an example method 400 implemented by an organization to use a third party server to store encrypted data on a third party database according to an embodiment. Data fields and/or objects are selected for encryption in an application running on the third party server. The data can then be encrypted on, for example, the internal server of the organization with a specified key prior to being sent to the third party database system for storage.

When the encrypted data is uploaded, additional data associated with it (e.g., metadata), such as identifiers corresponding to the respective encryption key, and location information to locate the key on the internal network of the organization is stored in the third party database system. Various embodiments of this method 400 are further described in the following paragraphs.

In step 410, a user of the organization selects data to be stored in encrypted form. The data may be an entire object, including one or more fields, or may include only select fields of an object. In one embodiment, an administrator of the organization manually selects which fields on which objects are encrypted and/or which objects are encrypted. In another embodiment, the objects for encryption may be restricted to custom objects. The selection of the data may be performed via an application, such as through a web interface provided by the third party (e.g., salesforce.com) and running on the third party server. To illustrate, consider for example a user from an organization. The user can log in to a webpage run by the third party and enter their selections of fields to be encrypted. Accordingly, when the data is entered to those specified field, encryption is performed prior to transfer to and storage on the third party database.

In various embodiments, the administrator can create a key object, which may be used as the metadata. In various embodiments, the key object can include one or more of the following variables: key.GUID—a globally unique identifier (ex: 123456-ABCDEF-0001); key.name—a friendly name for the key (ex: Human Resources Key—US); key.created—when the key was first created (ex: 01/01/2009); key.expiration—an optional date field for key expiration (ex: 01/01/2011); key.createdBy—the administrator who created this key (ex: jsmith); key.algorithm—the encryption algorithm for the key (ex: AES-256); key.isDeployed—a boolean value for whether the key has been deployed in the organization; key.isRetired—a boolean value for whether the key has been administratively retired; key.groups—a list of users and/or groups who are authorized to use this key; key.IPRanges—a list of IP Addresses or IP Address ranges that the Server may enforce before delivering the meta-data; key.inputValidation—a variable length list of input validators to be used by the Applet prior to encrypting the data and submitting the ciphertext to the Server; key.outputEncoding—a variable length list of escaping instructions and/or encoding functions to be performed by the Applet after decrypting the data and prior to rendering the plaintext in the browser; and key.location—the location of the key, which can be a logical location on the customer's internal network (ex: LDAP://DC=com,DC=internal,OU=groups,OU=encryption, CN=Key12345 OR HTTPS://internal.com/api/encryption-?key=12345).

As an example, the administrator can provide the following values for the variables: key.GUID (or globally unique identifier)="123456-ABCDEF-0001"; key.name="Human Resources"; key.created=01012009; key. expiration=01012011; key.createdBy="jsmith"; key.algorithm="AES-256"; key.isDeployed=1; key.isRetired=0; key.groups="Human_Resources_HQ, Human_Resources_Europe"; key.IPRanges="1.2.3.4-1.2.4.255"; key.inputValidation="{Validator1: String:FieldReference:/a-zA-Z0-9/}, {Validator2:Integer:FieldReference}, {Validator3:Boolean:FieldReference}"; key.outputEncoding="{EncodingRule1:Context:FieldReference:/< >/></}, {EncodingRule2:Context:FieldReference:/\s/%20/}"; and key.location="https://internal.com/api/encryption?key=123456-ABCDEF-001". The administrator can also select custom fields for encryption with the above key (or respective keys), such as Employee_c.salary_c.encryptionKey=123456-ABCDEF-0001, Employee_c.payGrade_c.encryptionKey=123456-ABCDEF-0001, Employee_c.comments_c.encryptionKey=123456-ABCDEF-0001.

As other examples of choosing which object and fields to encrypt with which keys, an administrator may choose to use the key "All Representatives" to encrypt the name and phone number fields of the Contact standard object. The administrator may choose to use another key "Human Resources" to encrypt the salary field of the Employee custom object. The Administrator can assign access for all sales and service representatives to the All Representatives key, allowing them to view the encrypted fields on the Contact object. The administrator can then assign permissions for members of the Human Resources group to use the "Human Resources" key, allowing them to view the encrypted salary field of the Employee object.

In step 420, the data is encrypted on, for example, the organization's internal server using the appropriate keys. The encryption can be performed by the user that selected the data to be encrypted, or by another user of the organization, e.g. any computer at the organization, (i.e., client-side). In one embodiment, different keys are used for different groups of users. For example, the same data may be encrypted twice. A first encryption could use a first key for a first group of users in the organization. A second encryption could use a second key for a second group of users in the same organization. Accordingly, when the information is called by a specific group, the metadata associated with data stored by the group of users (and the associated key) can be utilized to call the associated key and decrypt the data. A group may consist of only one user or multiple users. In another embodiment, different keys may be used for different objects. In a further embodiment, different keys may be used for different fields within an object. The key and corresponding object and/or fields may be pre-selected and defined by an administrator.

In some embodiments, an encryption algorithm is used to encrypt the data with the key specified by the administrator in the organization. In one embodiment, the encryption algorithm AES (128 or 256) is used. AES is a symmetric cipher that provides a combination of data privacy and computational efficiency for the encryption/decryption of the data. However, any algorithm that provides acceptable data privacy for the organization may be utilized to encrypt and decrypt the data. The encryption algorithm can conserve space and not cause the data in the fields to be greater than a maximum size usable for the unencrypted fields.

In step 430, the encrypted data is associated with respective identifiers, each corresponding to a respective key. In one embodiment, the organization provides an identifier associated with each key to the server 320. Thus, the organization communicates to the third party database system (e.g. server 320), which encrypted data (e.g. which objects, fields, etc.) is encrypted with which key. This may be done at the same time that the encrypted data is sent to the third party server. In another embodiment, the server (e.g., server 320) provides an identifier associated with each key to the organization, after data encrypted with the same key is identified and stored. If the server 320 provides the identifiers, such identifiers may be unique to the organization or globally unique to all organizations that store data at the database system. Regardless of which entity provides the identifier, the identifier can be known both to the organization and to the third party database, but may only be utilized by the organization to locate the key on the internal server.

An administrator, which can include a user with appropriate permission, may decide on a key to be utilized for storage of specified data (e.g., per object or per field). This may be performed with a setup page of an application running on the third party server. The application, which can act as a key manager, can have a setup page including a key name, a GUID, an issued date, an expiration date, an in use, and a where used. The key name may be a friendly name which can be an administrative alias, such as "Human Resources Group Key," and replaces and/or corresponds to an actual key (e.g., 12345-abcdef-xxxx).

The GUID, or globally unique identifier, as described above, may be specified by the organization or the third party server to reference the key utilized for encryption. The GUID can be utilized to retrieve the location of the key on the internal server when the encrypted data is called from the third party database. The issue date and expiration date are provided for enhanced security. The administrator may decide to expire a key a specified time after the issue date to ensure the key is not stolen. Thus, the issue date and expiration date are viewable so that they may be modified and/or the key may be modified prior to expirations. Accordingly, an "In Use Boolean" operator may be displayed to show if a key is currently being utilized or if it is expired. A "Where Used" operator may display objects and/or fields where they key is currently used.

In one embodiment, an administrator is able to open, save and/or edit a key file in an administrator editor application through the third party server (e.g., server 320). In one implementation, the server never stores the key file in the database, however, the database system may include API capabilities which allow for the user to access the key internally and provide instructions to modify the file. The key file may be stored on the organization's internal server (e.g., server 370). Accordingly, the editor, though running on the third party server, may need to be accessible by a user with appropriate permissions and through the internal server. Such an editor can allow for ease of use while editing and allow for a consistent format on both the internal system and the third party system. In some embodiments, the key, GUID, and issue/expiration dates can also be stored in the key file.

After a key is chosen, for example using an "App Key Management" tool, the administrator can decide which functions to enforce with the selected keys and objects/fields. The administrator can decide whether to encrypt all data in the selected objects and/or fields or decrypt them all. In one implementation, decrypting them all decrypts the data associated with the particular key being viewed and/or edited. The administrator may also decide to update and replace a key. In some implementations, a "Retire Key" function provides a mechanism to update keys. The Retire Key, function allows the administrator to decrypt data associated with a selected key and re-encrypt the data with a new key. For instance, utilizing the "Where Used" operator in the page setup, the administrator may elect to replace the key of multiple objects and/or fields utilizing the Retire Key function. However, because the third party will not have the key, the client may be required to ensure that all data encrypted under the old key is migrated to the new key. To aid in the Retire Key function, as part of flagging data fields for encryption, for example, on the organization's server, the application could additionally use a GUID or display a key version number in the setup page to instruct the client which key is or was used for a particular data.

Retirement may occur in multiple ways. For instance, an administrator may choose "lazy retirement." Lazy retirement specifies that any time a client accesses a data field associated with the retired key, the client will encrypt the data field(s) with a new key instead of the retired key. Another instance may be immediate retirement. In this scenario, the administrator may lock all records and fields encrypted with the retired key, download the data to the client, encrypt the data with a new key, and upload the newly encrypted data back to the server. This download may occur using a web service API, RESTful APIs, or variously formatted data exports such as XML or CSV data.

Referring back to method 400, in step 440, the information within the key file is provided to the third database system (310, 320) in order to locate the one or more keys. This location information and any identifiers are part of metadata that is associated with respective encryption data. The metadata is stored in addition to the encrypted information on the third party database and is provided to an applet when the encrypted data is later called for viewing by the organization. The metadata may be in any type of markup or programming language. For example, hypertext markup language (HTML) or extensible markup language (XML) may be utilized. As noted above, the metadata may include a file locator, which can be used to locate the key.

In one embodiment, the file locator may be an address on the internal network. For example, the address may be a URL, or an address usable by Simple Object Access Protocol (SOAP), Lightweight Directory Access Protocol (LDAP), or other webservice method on the internal server 370, which is running any suitable database, webservice, or other access application. In another embodiment, the information may simply be a flag that indicates that the data is encrypted. This embodiment may be used when there is only one key (e.g, global key and associated global identifier), and thus only one location. The browser utilized by the organization may be modified to contain the address and recognize the flag to retrieve the key from the particular address. In yet another embodiment, the information may specify a location on a particular user's disk drive at the organization. The key may be stored in that disk drive and/or that location may provide further indication as to where the key is stored on the internal server.

In step 450, the encrypted data is uploaded to the third party database 310, e.g. through server 320. In one embodiment, the algorithm utilized for the encryption may be stored on the third party server and called through reference in the metadata associated with the stored encrypted data. This may be useful for organizations with limited storage capacity as well as those having limited security capabilities. In another embodiment, the algorithm utilized to encrypt/decrypt the data may be stored on the internal server of the organization.

In step 460, the third party database system stores the encrypted data on the third party database 310. The metadata including any associated identifier(s), such as the GUID described above, is also stored with the associated, encrypted data. In one embodiment, a default setting of all the data using the same key is selected when no classification of which data uses the same key is made. Accordingly, the same GUID may be associated with each record of the stored encrypted from that organization. In another embodiment, if only one key is utilized by the organization (i.e., separate keys dependent on field, object, user, etc. are not utilized) no identifier may be provided within the metadata since only one key is used. In such an embodiment, a singular address to the location on the internal server of the organization may be provided in the metadata for all encrypted data provided by the organization.

In one embodiment, a lookup table and/or index within the third party database is used to map which database tables, records, and fields use each particular key. Individual objects within the database or object schema can be associated with a particular key's identifier (e.g. key.GUID) with individual fields on that object. When a user views the data fields of such an object, the server can send the metadata for key.GUID to the client as well as the object field metadata instructing the client which particular data fields are associated with this key meta data.

B. Retrieving the Data

Figure 5:
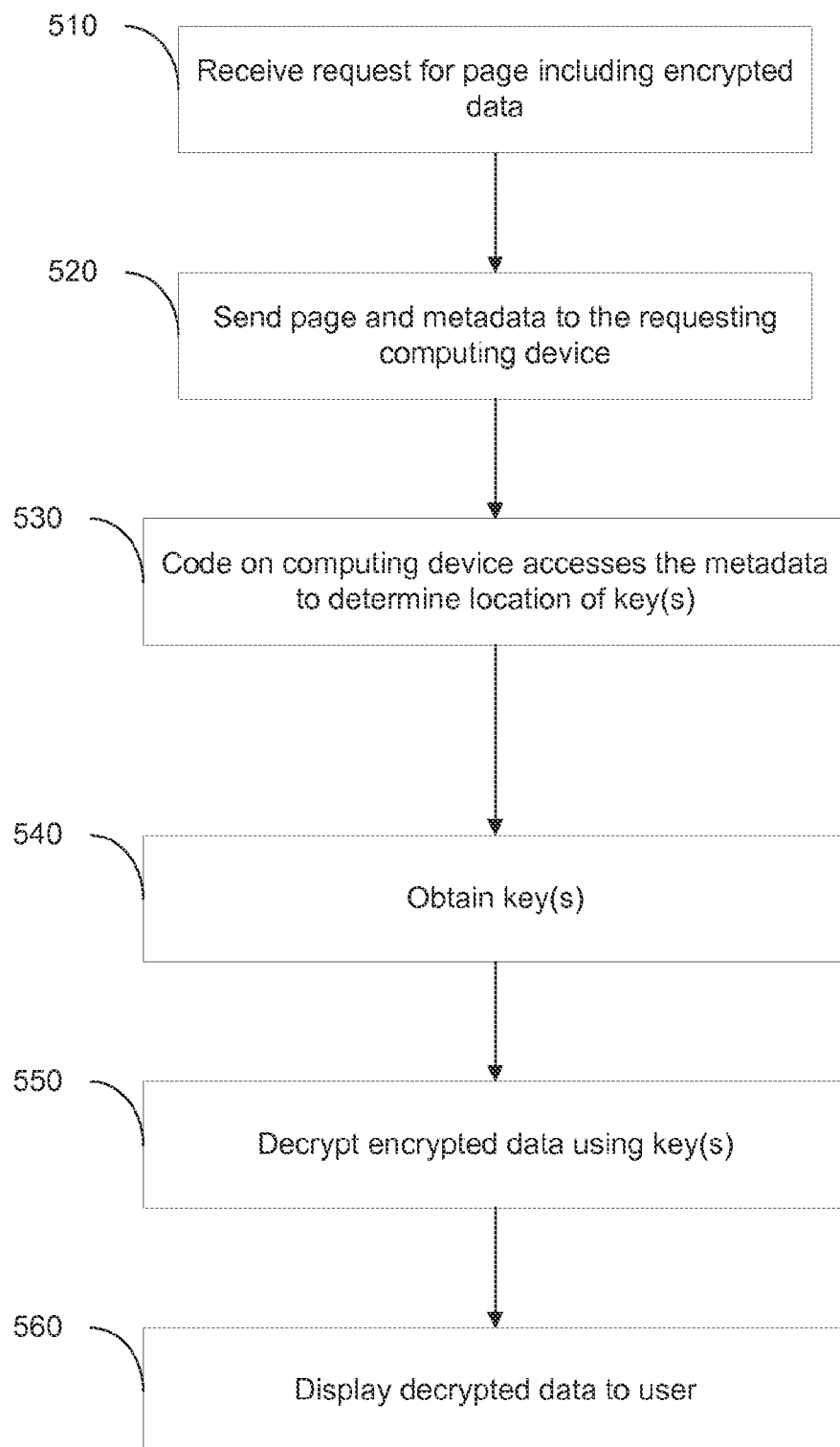
FIG. 5 is a flowchart illustrating a method 500 for providing decrypted data to a user from encrypted data stored on a third party database system according to an embodiment.

FIG. 5 is a flowchart illustrating a method 500 for providing decrypted data to a user at an organization from encrypted data stored on a third party server according to an embodiment. For instance, a user at the organization logs into the third party database through an application, retrieve and decrypt the encrypted data. In one implementation, the application invokes an applet. The applet utilizes metadata associated with the encrypted data to retrieve a key stored, for example, on the organization's internal server, which is only accessible by a user who is utilizing that server to gain access to the third party system. The encrypted data is downloaded into the browser page being viewed by the user, but is only displayed after decryption of the data occurs. Accordingly, the user experiences a seamless viewing of the requested data with the decryption process being completely transparent. Method 500 is further described in a step by step process in the following paragraphs.

In step 510, a user, from a computing device within an organization's internal network, makes a request for a page (e.g. encrypted page 340) that includes encrypted data. The request is received at the third party server (e.g., server 320). In one embodiment, all of the data on the requested page is encrypted. In other embodiments, only specified portions of data on the page are encrypted.

In step 520, the encrypted page along with metadata is retrieved from the third party database and sent to the user's computing device. For increased security, an Internet protocol (IP) address of the requesting computing device may be analyzed. In one embodiment, a requested page may only be sent to the computing device if the IP address is associated with the organization and meets predetermined criteria. For example, one such criteria may involve evaluating whether an IP address comes from within a specific country (e.g. one where the organization is based). The associated IP address may be stored within the metadata when the data is originally sent to the third party database. This added security restriction may be determined by the administrator at the organization and offered on the original page setup by the third party system and/or may be always enforced by the third party system.

Accordingly, IP range restrictions may be enforced on any user in the organization having access to the address where the encryption key can be stored. Consequently, a user may only be able to access the data when logging in from a particular computer, or network of computers. In a further embodiment, to see an encrypted field, the field needs to be present on a user's page layout. For instance, a user in the Human Resources department may not have access to a field which is present in the Accounting department. Both users may have a different key which decrypts the stored data as discussed in previous paragraphs. Accordingly, when a user from the Human Resources department attempts to download the page that includes Accounting fields, the page request returns an error. In another embodiment, the user may have to have permissions to see the URL locator for the encrypt/decrypt key. These user permissions may be set with an application on the server and set by the administrator.

In step 530, computer code within the requested page, accesses the metadata to determine the location of the key(s) on the internal network required to decrypt the data. Alternatively, the computer code to determine the key location is on the user's computing device which is utilized to send the page request to the third party system. In addition, the computer code used to locate and retrieve the key may be an applet, a small application program, plug-in, or some other form of code, which may be part of the requested page.

In one embodiment, if the encryption is done on a per object basis, the metadata specifies what the key for the entire page is in a singular location on the organization's internal network. However, in another embodiment, if the encryption is done on a per field basis, each encrypted field has its corresponding key GUID included as metadata. Though each field key GUID may correspond to a singular location and key on the organization's internal network, these GUID, in one implementation, are needed for each field. Accordingly, encryption on a per object basis may be preferable to an organization where all fields are viewable by all users, whereas a per field basis may be preferable to organizations with users in different departments having permissions for only specified data.

In one embodiment, the requested page (e.g. as HTML code) can include a function call to an internal server (e.g. server 370) to retrieve the key. This function call may be derived from the location information provided by the organization to the third party database. Alternatively, the function call may directly include the location information provided by the organization. For example, an administrator may specify the function call (e.g. in the page setup of the key manager application) causing the server to send a URL including the key location information as metadata to an applet. In another embodiment, as part of the metadata, location instructions can be provided to the Applet, which can provide the location instructions to another program, API, or server that facilitates key retrieval and/or encryption/decryption. In yet another embodiment, the requested page can present a password entry field to the user. This field could request the value of the key itself, and the user can type values of the key through the keyboard. Such a request still provides information to locate the key on the internal network; the location is an input from the user.

Generally, the organization is responsible for key management. In addition, the organization may also be responsible for key retention and making the key available on its internal network (e.g. using LDAP). In one embodiment, keys may be mapped to GUIDs stored in the application providing the requested page. Such an application may be running on the third party server (e.g., server 320) and, as a result, the administrator may need to provide the key location on the internal network through use of the GUID. Accordingly, less storage and handling is required of the organization. In such an embodiment, a key may be called via HTTP as specified by its GUID. For example, the metadata may include, internalserver/keys?GUID=123456, which specifies the GUID of "123456." When this URL is sent, the applet retrieves the key from the associated location on an internal server.

Referring back to method 500, in step 540, the key(s) are retrieved from a location on an internal network (e.g. a server) of the organization. The internal server may perform an authentication of the user's computing device which requested the key prior to allowing access to the key(s). For example, a media access control address identifier (MAC ID) may be utilized for validation, a user could be prompted to enter a password, or a cookie requiring the user to enter authentication information may be utilized. In one implementation, authorization and/or security instructions are passed to the Applet as metadata. The Applet can follow these instructions prior to attempting key retrieval, encryption/decryption, or any other program phase.

The additional security features may be implemented through the organization and triggered whenever a key is called. This process can allow the customer's Administrator to ensure that additional security or access requirements are met. For example, before the key(s) are retrieved, the user can be prompted for a password that the Applet will use to authenticate to the Key server. In addition or instead, the password can be used to access another program, file, or key storage mechanism on their local computer or a network server. In alternative embodiments, the key(s) may be retrieved from other internal resources.

The applet or other code can perform other checks prior to retrieving the keys. For example, whether the key is still valid, retired, or expired can be determined. These checks may also be performed before encryption, e.g. before the applet retrieves the key for encryption or just as a check to ensure a previously retrieved key is still valid. If the key is no longer valid, a new key may be retrieved.

In step 550, the encrypted data is decrypted using the called key(s). In one embodiment, an applet performs the decryption. The applet can also encrypt the data when the data is uploaded back to the third party server. In another embodiment, a local program on the user's computing device is utilized to decrypt the page. In yet another embodiment, a program on a server or other part of the internal network decrypts the data.

In step 560, the plain text data is displayed to the user. The display of the data preferably occurs in a same fashion as when the data is not encrypted. For example, the user is not prompted for a password or any other authentication as well as does not see any of the underlying decryption being performed. Hence, in this example, the decryption is transparent to the user. In other embodiments, the decryption may not be transparent.

FIGS. 6A and 6B illustrate pseudocode for a page 600 containing encrypted data and an applet 650 inserted in the requested page 600, respectively, according to an embodiment. In one implementation, the page includes a record of encrypted data as well as the metadata associated with it. In one implementation, the applet is kept as a separate file for easier management.

Specifically, the page elements of page 600 may include any HTML data (e.g., text and/or GUIs) relating to the form from which the record is being called and the applet which includes function to call the data, keys and algorithm (e.g., AES) and utilize the algorithm for two functions, encryption and decryption on the data with the called keys. When the page is being submitted to the third party server, the applet can utilize the referenced algorithm to encrypt the entered data with the appropriate key, which is located with an identifier (e.g. a GUID). When the page is being loaded for viewing by the user, the applet utilizes the referenced algorithm to decrypt the called data with the appropriate key.

The pseudocode for the Applet 650 (which is any code that can be run on the user's computer) displays an example set of public and private methods for both the encryption and decryption logic. Here, public methods are operations that can be called and read from the browser's page. Accordingly, any user may view them. In FIG. 6B, these methods include doEncrypt and doDecrypt. Private methods are protected from the browser's page. Accordingly, users may not call and view these methods. In this example, these methods include getKeys, readMetaData. These methods are kept private so that the encryption key is not exposed outside the customer's local network. In other implementations, other or different methods may called to perform the encrypt/decrypt functions of the Applet 650.

The methods shown in FIG. 6B provide a transparent display of plain text to the user. To illustrate, in one implementation, the decrypt method is triggered when the browser page has completed its transmission of the encrypted page from the third party server to the browser. At this point, the browser does not display the encrypted page to the user; instead, the contents of the complete page are shown. The content is shown because the decrypt method decrypts the data, or at least attempts to. As part of the decrypt process, the decrypt method triggers the private key retrieval methods. If the key retrieval methods are successful, the decryption process completes and displays the full, plain text page to the user. To the user, there is not a difference between an unencrypted page and an encrypted page since decryption and key retrieval are transparent.

In one implementation, the encryption method is the inverse of the decryption method. When a user submits a completed web form, the data is not actually sent to the third party server yet. For example, changing an account number or adding a new record may be entered and submitted by the user. After being submitted, the encrypt method is called, which may or may not trigger the key retrieval process dependent on whether the applet already has the correct key available. If the applet does not readily have the key available, the key retrieval function calls the key and then the data is encrypted. Once the data has been encrypted, the applet code submits the encrypted data to the third party database system. Similar to decryption occurring when a user requests an encrypted page, the encryption process can be transparent to the user, as the user only sees the data entered and submitted.

II. Searching the Encrypted Data

In one embodiment, any data that is client side encrypted will not be able to be searched on, reported on, or be used in work-flow or validation rules. This embodiment offers the highest form of security, as no information relating to the encrypted data is made available to the third party system. However, taking such security precautions may interfere with certain business processes or customizations the customer has in place on the third party database. In addition, such precautions may also pose problems for a server side input validation. For example, input validation is used to determine whether the data is accurate or of the proper type. If the server does not know what the data is because it is encrypted, the server cannot perform this function.

For example, if a customer were to encrypt a numeric field, such as a phone number, the encrypted data most likely contains non-numeric characters. Accordingly, in one embodiment, the encryption feature may be limited to text and/or description fields on standard objects, but may be any field on custom objects. This allows for numeric fields to still be searchable. In such an embodiment, a flag may be used to allow fields that normally require only numbers to have non-numbers when encryption is used, which allows for increased security.

In another embodiment, searching on encrypted data is possible, but very limited in order to maintain a certain level of confidentiality and security. For example, if the name "Acme Widgets" were encrypted, the encrypted data value would be indexed on the third party database. For example, using an encrypted search option, the user types in "Acme Widgets". The search string, in turn, is encrypted on the client. The encrypted data value is then sent as part of the search query. Because both the search string and the name "Acme Widgets" are encrypted with the same key, the encrypted indexed values matches the search value. Hence, the search returns the proper result.

In one implementation, the search option is limited. For example, if more than one key is in use by the organization (e.g., per field, per department, etc.), the third party system may not know which key to utilize for the search. In one embodiment, a search for the encrypted data associated with any key is performed. In another embodiment, the user requesting the search provides an identifier for the key so that only certain encrypted data associated with that key is searched.

In another embodiment, unencrypted keywords associated with particular fields may be provided by an organization. As previously discussed, these fields may be flagged to perform this operation. The keywords may convey the type of information contained in the encrypted fields, even though the actual data is still encrypted. Accordingly, these unencrypted keywords can be searched and the fields associated with them returned for decryption. Such an embodiment may be slightly less secure as the type of encrypted data may be known, but it adds more functionality to locate and return data.

III. Security Considerations

Searching data is not the only threat to maintaining complete confidentiality of data. Storing data externally and the process of sending and receiving confidential data to and from an external network may also cause security concerns. Such concerns stem from the fact that both parties may not be able to implement the amount of internal security checks normally utilized on all data entering and leaving each respective system. Accordingly, specific types of scripting attacks may be possible. Particular to external database storage, which require world wide web (WWW) data transfer and application usage, are cross site scripting (XSS) attacks.

As an example, XSS attacks can occur when specially crafted data or input is passed to a web-browser or web-enabled technology. This crafted data is then executed as code within the security context of the web page, browser, or web-enabled technology. The problem of XSS attacks are traditionally solved through two methods: 1) performing input validation routines on a third party server when the user submits data; and 2) performing escaping and encoding routines on potentially malicious data before the data is delivered to the web page, browser, or other web enabled technology. These methods are commonly referred to as input validation/output encoding. However, neither of these approaches are fully effective in this circumstance. Both the input validation and output encoding operations are dependent upon the server having context as to what the data looks like, and how it will be used and displayed. Because the data is encrypted, the server doesn't know the difference between an integer, a phone number, a first name, or malicious data.

Without careful implementation, XSS attacks may be possible on fields encrypted and stored on the third party database. For example, the third party server would not be able to perform server side validation or output escaping because the data is encrypted. Generally, server side validation involves routines called to check on data input into a system and to remove any data (e.g., characters) not corresponding to a set of rules. Output escaping allows a server to reject untrusted data received. Accordingly, in one implementation, output escaping is done as part of the Decrypt method called in the Applet 650.

Without careful implementation, XSS may also compromise client side (e.g., organization) encryption. For example, unencrypted data on the client may be compromised via XSS because of references to that data in a document object model (DOM). In a more sophisticated XSS attack, an attacker could fetch encrypted data and call the public Decrypt method in the user's browser in an attempt to get the plaintext values of fields. Note, however, that having access only to a user's session is insufficient for the attacker to compromise the system. In one implementation, the applet and the key must also be resident for an attacker to decrypt data. Two methods for improving security are provided in FIGS. 7A and 7B.

FIGS. 7A and 7B illustrate security methods according to an embodiment. In particular, FIG. 7A provides a method for overcoming an attack through output escaping. In one implementation, the method 700 is performed after decryption. FIG. 7B provides a method of validation. In one implementation, the method 750 can be performed prior to encryption of the data.

In FIG. 7A, a security method for output escaping is illustrated. In one implementation, the escaping is performed after decryption but prior to displaying the plain text data to the user. As previously mentioned, escaping allows the applet to reject untrusted data. In one embodiment, as part of the metadata for the encrypted data, data entity types are included and the applet performs the appropriate security methods to the data based on the entity type. Some examples for different entity types may be object types or character types such as Object Id, Phone Number or Generic Text, which all follow the rendering rules. The rendering rules may establish how, for example, the entities are indexed, called, processed or viewed.

In FIG. 7B, as part of the metadata for object and/or field elements on a page, a variable length list of data validators may be referenced. Validators represent different types of security validation methods that can be performed on data prior to encryption. For example, a validator is a method which ensures proper characters (e.g., numeric, alphanumeric, etc.) are entered in specific fields. Accordingly, the methods and checks are performed on the data prior to encryption.

Embodiments described herein can work equally well with any web browser, browser plugin, or web-enabled client technology. One implementation uses Java Web Applet code and/or Adobe Flash ActionScript. Other implementation can use other web-enabled technology frameworks, such as Adobe Air and Microsoft SilverLight. Private and protected variable strings within code can be used to enforce the privacy boundary of the Key Value. Using these technologies, internal server requests using HTTP, Web Service, LDAP, SOAP, etc., can be implemented. Another implementation can use Java Web Applet technology and the Internet Explorer and Mozilla Firefox web browsers.

Any of the computers may utilize any suitable number of subsystems. In one aspect, the subsystems are interconnected via a system bus. Additional subsystems such as a printer, keyboard, fixed disk, monitor, which is coupled to display adapter, and others are shown. Peripherals and input/output (I/O) devices, which couple to I/O controller, can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

The specific details of the specific aspects and embodiments may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of maintaining the confidentiality of data provided by an organization for storage on a database system including a server and a database, the method comprising:
receiving, by the server, data encrypted on an internal network of the organization using a first key, wherein the first key is stored on the internal network of the organization, the internal network being separate from an external network having the server of the database system by a firewall;
storing, by the server, the encrypted data on the database in association with metadata usable to locate the first key on the internal network of the organization;
providing, by the server, a login page allowing a user of a computing device on the internal network of the organization to log in as a client of the database system,
receiving, by the server, a request for the encrypted data from the computing device; and
sending, by the server, the encrypted data with the associated metadata to the computing device, wherein the metadata is usable by the computing device to locate the first key on the internal network of the organization and decrypt the encrypted data using the first key.

2. The method of claim 1, wherein the user logs in to the database system through the login page and selects an object stored on the database system for viewing, wherein the encrypted data comprises one or more fields within the object.

3. The method of claim 1, wherein sending the encrypted data comprises sending the encrypted data as part of a requested page including an applet, wherein the metadata specifies an algorithm utilized for encryption and for use by the applet, wherein the applet utilizes the metadata to obtain the first key and decrypt the encrypted data using the first key.

4. The method of claim 3, wherein the applet prompts for a password used to authenticate the computing device.

5. The method of claim 1, further comprising receiving selection of one or more fields of an object via an application running on the server of the database system, wherein the encrypted data comprises the one or more fields within the object.

6. The method of claim 5, wherein the data entered into the one or more fields is encrypted prior to transfer to the database system.

7. The method of claim 5, wherein different keys are used for different fields of the one or more fields.

8. The method of claim 5, wherein the metadata instructs the computing device which particular data fields of the object are associated with the metadata.

9. The method of claim 1, wherein:
the metadata includes an identifier corresponding to the first key; and
the organization provides the identifier associated with the first key to the database system at the same time that the encrypted data is sent to the database system.

10. The method of claim 1, further comprising providing a setup page within an administrator editor application running on the server of the database system, wherein an administrator is able to open, save, or edit the first key in the administrator editor application.

11. The method of claim 1, further comprising analyzing an address associated with the request, wherein sending the encrypted data with the associated metadata to the computing device comprises sending an encrypted page along with the metadata when the address is associated with the organization and meets predetermined criteria.

12. The method of claim 1, further comprising searching the database system using an encrypted search string from the computing device.

13. The method of claim 1, wherein sending the encrypted data comprises sending the encrypted data as part of a requested page including an applet, the metadata including one or more data entity types, wherein the applet performs one or more security methods on the encrypted data after decryption prior to displaying the decrypted data on the computing device.

14. A computer program product comprising a non-transitory computer readable medium storing a plurality of instructions for controlling one or more processors of the database system to perform the method of claim 1.

15. A system of maintaining confidentiality of data provided by an organization for storage on a database, the system comprising:
   one or more processors;
   a network interface to an external network separated from an internal network of the organization by a firewall; and
   a memory for storing instructions to control the processors, the instructions being executable by the one or more processors to:
      receive data encrypted on an internal network of the organization using a first key, wherein the first key is stored on the internal network of the organization;
      store the encrypted data on the database in association with metadata usable to locate the first key on the internal network of the organization;
      receive a request for the encrypted data from a computing device communicating on the internal network of the organization; and
      send the encrypted data with the associated metadata to the computing device, wherein the metadata is usable by the computing device to locate the first key on the internal network of the organization and decrypt the encrypted data using the first key.

16. A method of maintaining the confidentiality of data provided by an organization for storage on a database system including a server and a database, the method comprising:
   receiving, by the server, data encrypted on an internal network of the organization using a key, wherein the key is stored on the internal network of the organization and the internal network is separate from an external network having the server of the database system by a firewall;
   storing, by the server, the encrypted data on the database in association with metadata including key location information usable to locate the key on the internal network of the organization;
   providing, by the server, a webpage allowing a user of a computing device communicating on the internal network of the organization to log in as a client of the database system;
   receiving, by the server, a request for a page including the encrypted data from the computing device; and
   sending, by the server, the encrypted data and the associated metadata to the computing device as part of the requested page, wherein the associated metadata is usable by the computing device to locate the key on the internal network of the organization and decrypt the encrypted data using the key.

17. The method of claim 16, further comprising analyzing an Internet protocol (IP) address of the computing device, wherein the requested page is only sent to the computing device if the IP address is associated with the organization.

18. The method of claim 16, further comprising indexing an encrypted data value on the database system and returning the encrypted data when the encrypted data value matches an encrypted search value.

19. The method of claim 16, further comprising sending code to the computing device, wherein the code uses the metadata to obtain the key.

20. The method of claim 16, wherein the requested page includes an applet to be run on the computing device, the applet utilizing the key location information to call the key from a specified location in the internal network, decrypt the encrypted data using the key to obtain plain text data, and display the plain text data.

* * * * *